(12) United States Patent
Kamp

(10) Patent No.: US 9,907,236 B2
(45) Date of Patent: Mar. 6, 2018

(54) METHOD FOR CONTROLLING AND DIRECTING CLIMATE IN A SPACE

(75) Inventor: Petrus Gerardus Hendrikus Kamp, Amersfoort (NL)

(73) Assignee: Priva B.V. (NL)

( * ) Notice: Subject to any disclaimer, the term of this patent is extended or adjusted under 35 U.S.C. 154(b) by 510 days.

(21) Appl. No.: 13/147,485

(22) PCT Filed: Feb. 2, 2010

(86) PCT No.: PCT/NL2010/000016
§ 371 (c)(1),
(2), (4) Date: Aug. 2, 2011

(87) PCT Pub. No.: WO2010/087699
PCT Pub. Date: Aug. 5, 2010

(65) Prior Publication Data
US 2011/0287705 A1    Nov. 24, 2011

(30) Foreign Application Priority Data
Feb. 2, 2009 (NL) ...................................... 1036493

(51) Int. Cl.
*A01G 9/24*        (2006.01)
*F24F 11/00*       (2018.01)

(52) U.S. Cl.
CPC ................ *A01G 9/246* (2013.01); *A01G 9/24* (2013.01); *F24F 11/001* (2013.01); *F24F 11/0012* (2013.01)

(58) Field of Classification Search
CPC ........... A01G 9/246; A01G 9/24; A01G 31/02
(Continued)

(56) References Cited

U.S. PATENT DOCUMENTS 1,826,607 A * 10/1931 Eiben ................................. 47/17
2,193,911 A *  3/1940 Wright ............................. 47/17
(Continued)

FOREIGN PATENT DOCUMENTS

EP      1 464 218 A1   10/2004
EP       1464218 A1 * 10/2004   ............... A01G 9/18
(Continued)

OTHER PUBLICATIONS

"Concept and realization of an EIB based automated room climate control," EIB Conference, Technical University Munich, 2001, to Ruser et al. (Ruser).*

*Primary Examiner* — Alissa Tompkins
*Assistant Examiner* — Frances F Hamilton
(74) *Attorney, Agent, or Firm* — The Webb Law Firm

(57) ABSTRACT

Controls for the climate in a space such as a building such as greenhouse, barn, office and house or such as a vehicle such as car, ship and aircraft. An organism therein forms part of the control system for the climate in the space, and the controls comprise the at least co-controlling of the temperature of this organism. Use is here at made of at the level of the organism supplied, unsaturated, in dependence of directing by the controls conditioned air. The controls depart from a temperature registration of the organism and climate registration (temperature, air humidity and -speed) in the space at two respective height levels. With an at a first level established relation between climate parameters and organism temperature an expectation in organism temperature is determined on the basis of a change in the climate parameters at the second level.

7 Claims, 2 Drawing Sheets

Figure 1:
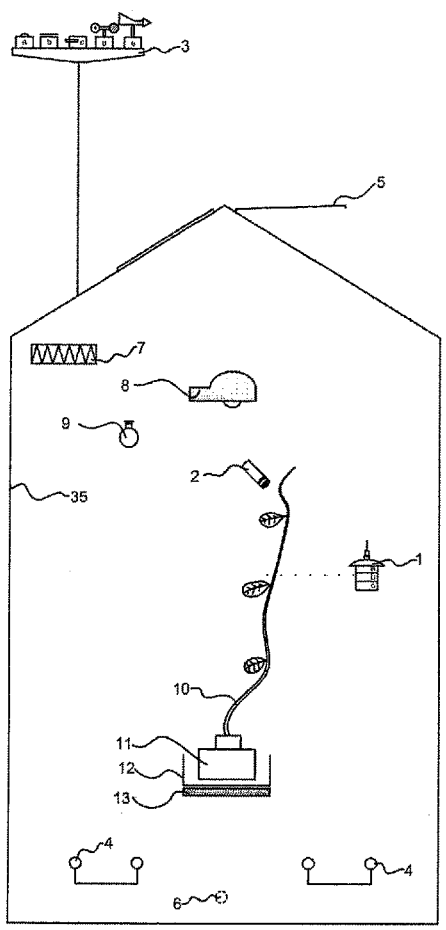

(58) Field of Classification Search
USPC .............. 454/229, 239, 228; 73/23.2, 863.82,
73/864.73; 47/17
See application file for complete search history.

(56) References Cited

U.S. PATENT DOCUMENTS

| | | | | |
|---|---|---|---|---|
| 2,857,108 | A * | 10/1958 | Wallace | 237/53 |
| 3,078,780 | A * | 2/1963 | Bottlander | 454/333 |
| 3,381,409 | A | 5/1968 | Lamont | |
| 3,404,618 | A * | 10/1968 | Jacobs | 454/236 |
| 3,446,272 | A * | 5/1969 | Gaines, Jr. | 165/229 |
| 3,747,501 | A * | 7/1973 | Honda et al. | 454/228 |
| 3,925,928 | A * | 12/1975 | Constantinescu | A01G 9/246 454/337 |
| 3,949,522 | A * | 4/1976 | Kehl et al. | 47/17 |
| 3,956,852 | A * | 5/1976 | Ceausescu et al. | 47/17 |
| 4,047,328 | A * | 9/1977 | Kehl et al. | 47/59 R |
| 4,197,991 | A * | 4/1980 | D'Amato | 236/44 A |
| 4,265,300 | A * | 5/1981 | Kurimoto | 165/47 |
| 4,567,732 | A * | 2/1986 | Landstrom et al. | 62/91 |
| 4,609,346 | A * | 9/1986 | Siccardi | 432/222 |
| 5,001,859 | A * | 3/1991 | Sprung | 47/17 |
| 5,096,294 | A * | 3/1992 | Layzell et al. | 356/326 |
| 5,299,383 | A * | 4/1994 | Takakura et al. | 47/58.1 R |
| 5,392,611 | A * | 2/1995 | Assaf et al. | 62/94 |
| 5,791,983 | A * | 8/1998 | Robertson | F24F 7/08 454/229 |
| 5,965,801 | A * | 10/1999 | Layzell et al. | 73/23.2 |
| 6,725,598 | B2 * | 4/2004 | Yoneda et al. | 47/60 |
| 7,228,657 | B2 * | 6/2007 | Brault et al. | 47/17 |
| 7,565,768 | B2 * | 7/2009 | Bula | 47/89 |
| 7,660,698 | B1 * | 2/2010 | Seelig et al. | 702/170 |
| 7,925,469 | B2 * | 4/2011 | Delin et al. | 702/178 |
| RE42,735 | E * | 9/2011 | Bagwell | 236/49.3 |
| 8,210,126 | B2 * | 7/2012 | Sia | A01K 31/00 119/436 |
| 8,558,157 | B2 * | 10/2013 | Holland | 250/206.1 |
| 8,707,617 | B2 * | 4/2014 | Houweling | A01G 9/246 47/17 |
| 8,850,742 | B2 * | 10/2014 | Dube | 47/17 |
| 2004/0194371 | A1 * | 10/2004 | Kinnis | A01G 9/246 47/17 |
| 2005/0257827 | A1 * | 11/2005 | Gaudiana et al. | 136/263 |
| 2007/0012349 | A1 * | 1/2007 | Gaudiana et al. | 136/244 |
| 2007/0044445 | A1 * | 3/2007 | Spicer et al. | 56/10.1 |
| 2008/0000151 | A1 * | 1/2008 | Houweling | A01G 9/246 47/17 |
| 2008/0142197 | A1 * | 6/2008 | Van Andel | A01G 9/246 165/122 |
| 2009/0025287 | A1 * | 1/2009 | Lee | 47/17 |
| 2009/0076658 | A1 * | 3/2009 | Kinnis | F24F 11/0001 700/277 |
| 2010/0126062 | A1 * | 5/2010 | Houweling | A01G 9/246 47/17 |
| 2011/0143646 | A1 * | 6/2011 | Van Der Kooij | 454/237 |
| 2011/0162116 | A1 * | 6/2011 | Holman | 800/306 |

FOREIGN PATENT DOCUMENTS

| | | | | |
|---|---|---|---|---|
| EP | 1464218 | A1 * | 10/2006 | ............... A01G 9/18 |
| EP | 1 782 684 | A1 | 5/2007 | |
| EP | 1 908 809 | A1 | 4/2008 | |
| FR | 2 502 895 | A1 | 10/1982 | |
| NL | 1020694 | C1 | 7/2003 | |
| WO | 2007/053011 | A1 | 5/2007 | |

* cited by examiner

METHOD FOR CONTROLLING AND DIRECTING CLIMATE IN A SPACE

BACKGROUND OF THE INVENTION

Field of the Invention

The present invention relates to a control system for the control of the climate in spaces for the housing of organisms such as men, animal and plant.

Description of the Related Art

Control systems for such buildings are generally known, in particular in the form of climate control systems for crop growth in greenhouses. The application of these known control systems in greenhouses has often a focus which can be retraced to knowledge from the dissertation "Greenhouse climate: from physical processes to a dynamic model", G.P.A. Bot, Wageningen 1983. The control systems known from the glasshouse crop growth are hence focused to the controlling of the climate in a building in which the organism is formed by a plant. At such it is the intention to realize a for the growth and development of the concerned organisms optimally suited inner climate or glasshouse climate. Normally these greenhouse control systems depart from interaction between plant and environment, with in a control loop to control climate factors, mostly temperature, degree of humidity, content, i.e. fraction of carbon dioxide, amount incident light, and air movement in the greenhouse. Often these growth factors are controlled, at least mutually attuned with the aid of a plurality of mutually interconnected balances, which in physical manner describe the in- and outgoing streams for the greenhouse. At this, the to be controlled values are attuned to known requirements of the physiology of the organism, here the plant, whether or not completed with theoretical and/or empirically developed models.

The known controls have as a disadvantage that it is departed from an empirically determined relation between organism and environmental factors, in particular in their application for greenhouse buildings, where this kind of controls have realized their development in particular. For the control it is departed from a average value for a climate factor such as temperature. This average value can in practice however, virtually not be maintained, for as far it can be realized at all. This is in the case of a greenhouse not in last instance caused by mutual interaction between climate factors. If for instance the irradiation increases, the plant temperature raises and with that the greenhouse temperature. If at more irradiation evaporation increases, relative humidity of greenhouse air increase; should however the increase of the greenhouse temperature surpass the increase of the air humidity, then rather the relative air humidity decreases. This interaction is once more re-enforced by the change of climate factors, in particular therein the irradiation influx. The latter can, at unfavourable days, change with considerable jumps from 200 to 300 Watt per square meter (W/m2) within a large range of capacities from 100 to 1100 W/m2. Aside from this there are desired and undesired interactions between climate factors at the start-up and controlling of equipment. In this manner for instance, in case of a heat surplus, the greenhouse temperature is often decreased by opening the glasshouse windows.

The opening or closing of the aeration, i.e. ventilation windows or the lowering or raising of the tube temperature, that is to say of the heating, at the controlling of the greenhouse temperature however, also renders a disturbance of the relative air humidity. The mutual interactions between climate factors, crop and equipment or apparatuses (aeration, heating, screening, lighting, etc) thus often hinders the known climate controls. These complications apply in conformance with insight underlying the invention analogously in other spaces to be conditioned, in particular for the housing of living organisms. Such spaces can be as well be buildings as transport means, such as domestic houses, offices, barns, land vehicles, ships and air planes, therein included whether or not physically separated parts thereof. Conform further insight underlying the invention such complications also present themselves, and the here to be presented invention can also favourably be applied there, in transport units, such including vehicles for men, such as cars, busses and air planes.

Although at least in greenhouse buildings use has been made of climate controls for inner climate already for various decennia, the models in practice mean a highly nervous controlling, at least characterize itself by continuously active directing of climate influencing factors that are part of the equipment of the building. Apart from ventilation windows, these include heating elements, moistening an de-moistening apparatuses, and screening arrangements for the shadowing of the organism in the building, and $CO_2$-installatations. Ventilators can furthermore be present for the internal distribution and/or mixing of air. In the glasshouse horticulture, the known control systems nevertheless operate in the before described manner with a view to maintaining the inner climate stable as possible, with a massive plurality of set points for each of the growth factors in a greenhouse. Per sub-section in a greenhouse it is not uncommon that between 250 and 400 so-called set points are present. The known controls is hence not only complex in realization of the controls itself, but also sensitive as to maintenance and relatively expensive in development.

An attempt to improve the known climate controls at least for the glasshouse horticulture is known by the international patent publication WO2007053011. This attempt is focused to controlling of crop growth by departing from a so-called microclimate, localized around the organism to which the climate control for the building is normally directed. Herewith is meant a directly around the plant created and to be controlled climate with the support of various support means that are now included in the greenhouse in the immediate vicinity of the plant. These means at least comprise moisturizers and, separate from that, de-moisturizers which can each simultaneously take care for heating or else cooling in the thus to create, so-called micro-climate. This system can be provided with as well in the immediate vicinity of the organism, in casu plants, included hygroscopic valves, intended for the intake and discharge of a surplus of heat and/or moisture, relative to optimal values for an as ideal defined, at least intended local climate for the organism. In fact this publicities herewith defines an in size adapted climate space relative to the greenhouse, which is provided with intervention means adapted thereto. The publication is silent as to any possible controls required for the sketched, so-called microclimate.

SUMMARY OF THE INVENTION

The present invention on the contrary has as a goal to arrive at an essential innovation in the model for the controls of a climate created in spaces for the housing of organisms such as plants of horticultural crops, animals and men, as well as to the concipiation of support means adapted thereto.

The invention hence relates to a control including, at least thereto facilitating, that a method or else a system for the control of a climate, comprises one or more condition parameters of the organism as part of the so-called control loop, and wherein the supply of unsaturated conditioned air is applied for the realisation of the climate, in a embodiment from a height level under the upper part of the concerned organism. With a such controls primarily a climate is created directly around the organism, that at least apparently is experienced as comfortable, for instance as growth stimulating in case of plants, in dependence of the registered temperature of the organism, and that yet leads to a considerable reduction in use of energy. The present invention is thereby in particular aimed at the well feeling of an in a space included organism by periodical variation in the condition of the air surrounding the organism surrounding air, in particular by directing towards a deceleration or else acceleration of a amongst others with the controls to be induced vertical, further unforced stream of air along the organism, while using known per se, thereto physical principles.

At this latter, use is made of a further insight underlying the invention, according to which the air along the organism moves at least quasi unforced, preferably with an at least predominantly unitary acceleration. With a such like controls, in analogy either the comfort for plants, or for animals or men in a space may be directed. To such, unforced administered air other than a required amount of energy for exiting the openings in a supply element, no of hardly any energy is added, such that the air moves only for replacement of at that place elevating air. The temperature and/or humidity of this air, which according to the invention is administered in the immediate vicinity of the organism, at least supplied, is controlled in reaction to a determined value of one or more condition parameters of one or more organism of a population in a building, at least unit or compartment thereof.

The invention further makes use of the insight and within physics known per se phenomenon that moist air is lighter then dry air, and hence will raise. Now by supplying unsaturated air in the vicinity, for instance at chest height of sitting or else standing organism, the speed of the air increases with adding of moisture by the organism in the elevating air. If no air raises along the organism, the feeling of discomfort at the organism or the organism increases as a consequence of not or too limited being able to discharge moisture. It is hence better to have a stream of air along the organism to discharge moisture. Such moisture discharge at men largely takes place via mouth, nose and skin of the head, and at the plant at all levels where leaves are present. The raised air is preferably actively discharged via an air discharge, for the invention included at the upper side of the organism, mostly against or else in the upper side of the controlled space.

The invention further makes use of the as well known per se given that at least warm blooded organism such as men and animals are not sensible to temperature in absolute sense. This means that with the presently proposed controls with which the useable refreshment for at least largely enclosed spaces is arranged such that the circulation, that is to say upraise thereof is induced by the organism c.q. the organism itself, as a consequence of, or while using natural discharge of moisture by the organism. Prerequisite hereto is that the air brought in is unsaturated and is administered at least under the nominal level of moisture discharge by the organism.

In a particular embodiment the controls direct the aimed natural streaming of air by performing a measurement of the temperature and humidity at, at least two height levels of the air at the one hand, and the temperature of the organism at the other hand. With the aid of such measurements a relation is made at a first level between the condition of the organism and its environment and, with the aid of this relation and the actual measurements at the second level, a possible difference is determined between an actual temperature of the organism and a to be expected, c.q. aimed or desired temperature, and the relative air humidity and/or temperature of the administered air is influenced in dependence of this determination or establishment.

In the particular case at which the organism is formed by plants, the invention is directed to influencing the boundary layer of humid, saturated air around the leave of the organism, in a manner at which the thickness of this boundary layer is influenced and directed, i.e. controlled. This also includes that this layer is reduced by the creation of a stream of air with unsaturated air, for the promotion of vaporisation. To this end the invention hence comprises that a condition parameter of the organism, in particular the temperature thereof is influenced by the administering of air of a conditioned humidity. At this, the invention makes use of an underlying, in itself known insight that skin pores or else so-called stoma or skin mouths, in more of lesser amount are opened in dependence of circumstances such as a need or else mechanism towards cooling down in the organism by vaporisation of moisture or else, preventing of cooling down by the far as possible closing of stoma. Preferably the conditioned air is administered near the lower part of the organism and in case of a plant under the lower leaves thereof. At such it is in conformance with underlying insight already taken into account that the eventual vaporisation, near the opening of the stoma depends on the thickness of the boundary layer and the internal resistance against release of moisture in the organism. A particular aspect at the present invention is that it departs from the fact that a direct environment of the organism is included in the model for a climate control such as in a building, at least is direct measured and influenced. The model and the controls according to the invention take into account that the climate in the vicinity of the organism in fact so closely connected with the organism itself, at least is so closely situated thereto, that it at least with respect to the condition factor temperature is indicative for a related value in said condition factor of the organism and vice versa. In a follow up step of the idea underlying the present invention it is recognised that influencing of the condition of an organism can hence can take place via the direct environment thereof.

According to again further development of the idea of the invention, it is recognised that the direct environment of the organism is to be influenced by exchange processes that are based on principles of physics, preferably while using the influencing of the thickness of the boundary layer of saturated air around the leave of a plant. The steering and influencing of this boundary layer should according to the invention take place via natural, unforced streaming, i.e. movement of air. Also here it counts that the given known in itself, that cooling of the organism can take place via vaporisation, by transport of water vapour in unsaturated air. According to further with the invention applied physical insight, the surrounding air attains a lower specific mass, i.e. density with the humidification thereof, which leads to the raise, i.e. ascending of this surrounding air. The moisturised air is preferably at least largely catched, i.e. intercepted, but can in an alternative embodiment also be discharged via windows opened to a limited extend, for instance greenhouse windows, whether or not in combination with limited circulation of the air.

It is a merit of the present invention to depart from the insight that the self cooling capacity of a plant or other kind of organism, of animal or horticultural nature, is to be applied, and at least at plants should even be a point of departure for the control of a climate in a building, for instance greenhouse. Use is herein made of the in itself in physics, but in practice of the climate controls not known, at least not applied insight that moisturised air is lighter and therefore ascends, or forms a thriving force for an otherwise unforced, at least not artificially forced upwards stream of air along the organism.

In the supply channels or ducts there is no other pressure then that which required for the overcoming of an exit resistance for the air carried by the channels or ducts. Departing from the insight and fact that relatively moist air is lighter in specific mass, at vaporisation of the organism a natural stream of air elevating along the organism is caused, with the prerequisite that the administered air is unsaturated, that is to say a stream that is based on exchange with the boundary layer of an organism from a population, for instance a plant of a crop. A such naturally ascending stream influences, differently than air administered with force such as in known controls, the thickness of the saturated layer of air directly around the leave. With the maintenance of a such unforced stream, according to underlying hypothesis a optimal exchange of water vapour is realised. The until now commonly used term "climate controls" could on the basis of the present invention, in conformance with an essential and at the invention also underlying insight, hence be denoted as "a to an organism adapting climate controls". With the present invention and the therewith applied underlying insights the organism is for the first time in history included in the control loop for the control of and directing of a inner climate.

In again a further development of the idea according to the invention air ascends as a consequence of either temperature or humidity, with as detail that a higher air humidity goes along with a stream of air increasing in speed. The present invention hence comprises the controlling of as well the temperature as the air humidity in the air administered at the organism, c.q. crop. In this manner exchange with an organism and with that the organism itself is influenced and a relatively quick physiological reaction of the organism can be attained. At such, a for the well being of the organism itself, in case of plants, a for crop growth and development favourable condition can be maintained. This includes, in accordance with further insight underlying the invention, that the environment is subjected to a lightly varying change in moisture content or temperature or both, in a pulsating or periodical manner. According to a hypothesis underlying this insight, such leads to at men virtually unnoticed, however as pleasantly experienced activation of the physiological process in the organism. Hence also a stress reaction of the organism can be generated, which at plants results in for instance flowering or ripening of fruits. In addition to raise of the well being of organism in a space with an according to the present invention controlled climate, and the therewith mostly occurring significant amount in savings in energy, the present invention hence has as a side effect that it can in case of crops be applied for controlled generation of certain physiological reactions such as ripening. This latter has for an advantage that a greenhouse space with controls according to the present invention can be utilised with even improved amount of efficiency. In a practical elaboration of the invention the controls is directed at a conditioned stream of air, utilising a temperature- and/or air humidity gradient between the air supplied and that of the boundary layer of the organism. To this end measuring equipment is placed in the concerned space of the building, directed to detections at the population, with in itself known sensors included at least at two places differing in height level, which with respect to at least the factor temperature determine the condition of the organism. At corresponding levels are included in the stream of air near the organism at least a temperature- and an air humidity sensor. With the aid of these values and the general gas law an unforced ascending stream of air is calculated, and the values for air humidity and/or temperature of the supplied air are adapted by means of the measured temperature of the organism. Such adaptations in practice result very fast, at plants for instance lead to a reaction of the organism within several minutes. With the such measuring of and reacting on the condition of the organism, the latter has become part of the model of a climate controls according to the present invention. It is remarked that the use of an air speed sensor, that is to say a direct detection of the air speed rather than indirect or derived such as presently proposed, using in itself known measuring equipment for temperature and humidity, is also included in the invention.

The present invention provides with its new concept and elaboration, at least practical realisation thereof, not only a revolutionary changed model for climate control in buildings, but also a revolutionary change in resulting yield and control of growth of plants, or else considerable energy savings in the heating of spaces, by the realisation of a comfortable heat sensation at lower temperature. From tests with the new model it has proven that application thereof at plants can bring about, increases in yield of 10% in a conventional and up to 30% in a closed greenhouse, relative to the controls known up to now. Moreover, the new model can be employed for causing earlier or else later ripening of flowers and fruits of the crop. With the new controls hence not only an increased yield can be realised, but in fact also a predetermined, i.e. desired instance and/or yield level can be entered. Even more then for increase of yield in itself, the new system is hence of utterly great importance for the improvement of production efficiency and decrease of use energy. A general increase in efficiency is with the present possibilities of control made possible in horticulture.

BRIEF DESCRIPTION OF THE DRAWINGS

The invention will now by way of example be elucidated more closely along drawings of a system in which the organism is included in the control loop for the controls of the climate, and in which:

FIG. 1 is a schematic representation of a model such as is known in the prior art and is applied in common climate controls;

FIG. 2 is a representation in conformance with FIG. 1, of the model according to the present invention;

FIG. 3*a* is a schematic overview of the amount and kind of measurements known in the prior art and that are conducted in a conventional greenhouse;

FIG. 3B provides, in an arrangement in accordance with FIG. 3A, measurements in conformance with the model of the invention.

FIG. 4 is an example of a computerised control panel for a method and control system according to the invention.

DESCRIPTION OF THE PREFERRED EMBODIMENT(S)

In the figures corresponding constructional parts are referred to with identical reference signs. In the hereelaborated examples, the organism is represented as a plant and the space with a climate to be controlled as a whether or not so-called closed horticultural greenhouse. It goes without saying that the controls and processes occur in analogy at men and animal, in respectively a house or utility, or else in a barn, or a space in a transport vehicle such as an aircraft and car. The invention hence, irrespective of the used examples, explicitly departs from a climate controls for every space intended for the housing of an organism.

FIG. 1 illustrates by way of example, by means of a schematic representation a generally used model for a controls of a climate in a building for the accommodation and housing of an organism such as plant, men and animal. In the present example a such building is represented by means of a traditional greenhouse 35. It is as well as other buildings such as houses and stables or barns, provided with an in this figure not further represented control unit. This unit is responsible for the automatic control of the climate in the building, in casu the greenhouse. A such controls is mostly focussed at a target climate, often a target temperature in the building, and departs therein from detection, that is to say automatic registering of internal and external climate data for the building, and the control of building components. In this example these are greenhouse components such as heating tubes 4 of a heating arrangement for the building, ventilation openings 5 of an aeration or ventilating arrangement for ventilation of the building, $CO_2$-administring tubes 6 of a possible $CO_2$ administering arrangement, screening 7 of a screening arrangement for the building, lighting 8 of a lighting arrangement, and moisturisation point 9 of a possible moisturising arrangement. The greenhouse components for the largest part have their analogue form of appearance in buildings for men or else animal.

With the automatic controls, use is made of internal and external climate data such as included via for instance an external weather station 3 and via internal sensors with climate sensor sets 1 and organism temperature sensors 2 for the registering of the temperature of the organism present in the building, in this example a crop temperature sensor. The sensor sets 1 for the registering of values for the internal climate mostly comprise sensors for the measurement of the air temperature Ti, the relative air humidity Mi and the $CO_2$-content Q in the air. Aside this, it can often be availed of a registration arrangement for the registration of values for the temperature of the crop, provided with crop temperature sensors 2. The values for external climate data handled by the control unit, in a known controls arrangement comprise, apart from those for solar radiation W and temperature To, mostly also those for relative air humidity Mo, wind speed and wind direction.

The known greenhouse mostly comprises a number of climate influencing elements with near the lower part of the greenhouse heating tubes 4, a flow of more or less heated water through it, and one or more $CO_2$ supply ducts 6 for the supply of $CO_2$, for instance for the promotion of crop growth. The heating tubes 4 and $CO_2$-supply tubes 6 are often included in the vicinity of, at least under the height level of a substrate gutter 12, or else gutter of holder 12 for a different kind of rooting basis 11 for a crop. The crop is in the figures represented by a exemplary plant 10 from a horticulture crop such as tomato, at which the plant is represented with the view of a cross section of a row of plants, and wherein only the outgrow thereof to the right side half of the plant is represented. The substrate gutter 12 is placed at a weight measuring arrangement for determining increase in weight of and/or use of water by the crop.

Close to the upper side thereof the known greenhouse comprises a known fine spraying arrangement 9, in the figure represented by a single spray nozzle thereof, a known lighting installation 8 for the crop, here represented by a single lamp thereof, and a known screening- or else darkening installation 7, for the partial respectively full darkening of the crop. In the notch the greenhouse comprises a ventilation opening with an automatically controlled deck part or window 5, controlled under direction by a furthermore to the greenhouse belonging, in the figure not further represented control unit, often a computer system.

The automatically controlled window 5 has an important role in the traditional greenhouse in the controlling of the glasshouse climate. Normally this means that the ventilation opening is at least employed for the discharge of overheated air, and the administering of outside air of a lower temperature. With the regular, i.e. often opening of ventilation window 5, the optimal $CO_2$ content can only with difficulty be attained, so that the $CO_2$-dosing by means of supply tubes 6, is in the known greenhouse regularly of not virtually mostly controlled at its maximum capacity. For the equal distribution of heat and $CO_2$ in the figure non-depicted ventilators can be present.

For well balanced distributed realisation of targeted optima for temperature Ti, relative air humidity Mi and $CO_2$-content Qi, the known greenhouse comprises a very large plurality of sensor sets 1, which sets comprise at least a temperature sensor and a relative humidity sensor. A number of sensor sets 1 also comprises a sensor for the determination of the $CO_2$-content Qi in the greenhouse. The crop directed sensors 2 for the determination of the temperature thereof are mostly contactless, for instance embodied as infrared sensor. The known greenhouse may, per sub-section, that is to say a not necessarily physically separated part of the greenhouse of which the tubing for heating can be independently controlled, typically comprise between 250 and 400 so-called set points, where the inner climate is registered by means of the said sensors.

The in the known greenhouse construction often applied method and the thereupon based control systems are focussed on the controlling of as ideal for a growth climate determined values for temperature Tid, air humidity Mid and $CO_2$-content Qid in the greenhouse, that is to say in the entirety of the greenhouse, or else in the direct environment of the crop. The known systems correct for deviations there from such as at consequence of changing irradiation of light or outside temperature, by the directing of said influencing means such as windows 5, heating tubes 4 and screening arrangements 7. the air supply channels 6 are in the known climate controls, at least in the known growth systems for horticultural crops applied for the administering $CO_2$.

Figure 2:
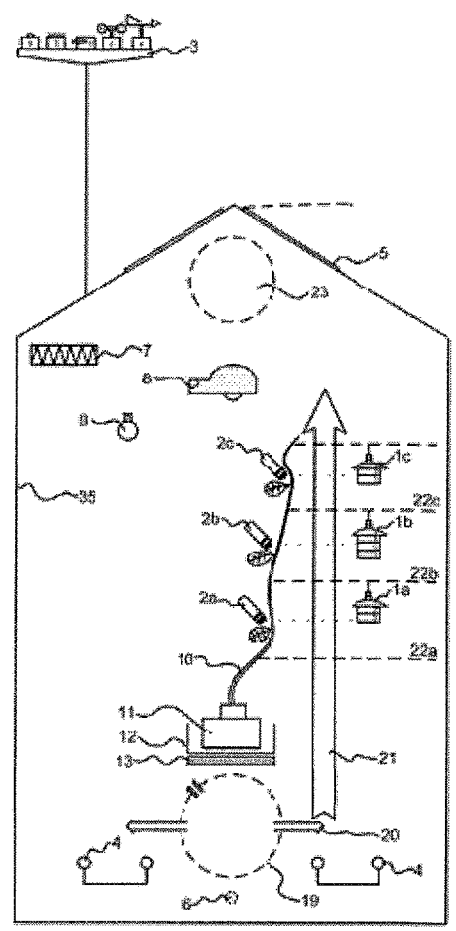
Figure 3A:
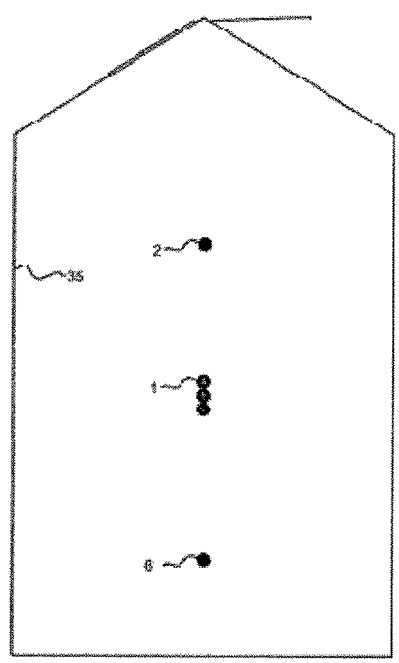
Figure 3B:
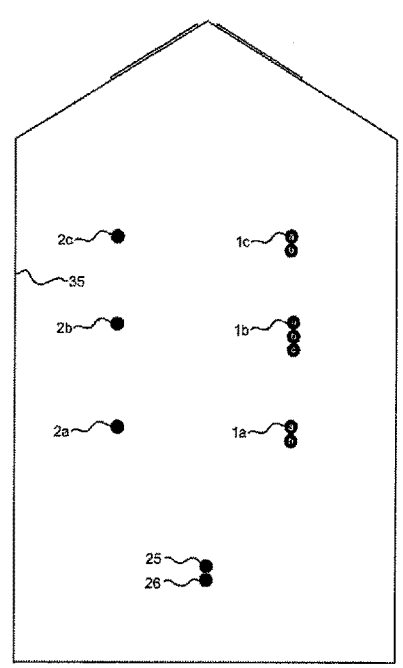

FIG. 2 illustrates a greenhouse such as can be arranged for a control system according to the present invention, wherein as well as greenhouse temperature Ti and relative air humidity Mi, as plant temperature Tp, are registered at least at two respective heights A, and B or C such as in FIG. 2. This new model departs from cooling the glasshouse climate by the crop in adiabatic manner, by taking over moisture from the plants 10. The model, on the basis of physical principles, departs from the origination thereby of an ascending flow of air 21 in the immediate vicinity of the plant, in a natural manner along the plant 10, or the crop. Use is made herein of the in meteorology known and physically explained principle that moist air is lighter then dry air, and hence will ascend, or comes to a natural, unforced circulation, in fact passage of air along the plant 10, in the figure represented by arrow 21. The crop, at least the plant is hereby enabled to cool itself by means of vaporisation. The phenomenon of air elevating by moisture take over has until now at least apparently been taken as of a negligible order for the in the known greenhouse occurring climatologic processes, so that the inclusion hereof in a climate model and the thereupon based controls is entirely new.

The inclusion according to the invention of the physical phenomenon of air ascending by absorption of moisture, explains itself in combination with yet a further insight underlying the invention. According to this, the controls for the climate of a building in the first place is, at least is also to be based upon the inclusion of the organism in a climate controls, that is to say the possibility towards adiabatic cooling that is offered by the organism. Although the physical phenomenon of adiabatic cooling as a physical phenomenon is known per se, the application thereof for the control of a glasshouse climate is as well considered entirely new. The invention has for a further underlying insight that the fact known per se of the presence of a so-called boundary layer around an organism, for instance around the leave of the crop, an influence-able layer of air as it were, is to be controlled with a view to optimising the process of adiabatic cooling, at least vaporisation of moisture. It is recognised that allowing powerful flows of air, such as an airstream, outflow thereof or as a consequence of via ventilation openings in the greenhouse occurring whirls this layer may be disturbed, and with that the optimal vaporisation. Eventually such disturbances, certainly at relatively long endurance thereof, thus also mean that the organism or the population thereof, for instance does not reach its optimal growth condition. In accordance with yet further, in itself known insight underlying the invention, exchange of moisture between an organism and air elevating there alongside is optimal at a regulated thickness of the saturated layer of air around the leave, the speed of vaporisation therein being dependent from a moisture content gradient between the boundary layers in the crop and the surrounding, as a consequence of intake of moisture ascending air.

The in the preceding described basic principle for a new controls for the climate in a building such as a greenhouse, can as well be applied in the known open greenhouse types such as a Venlo greenhouse, as in more modern and energetically so-called closed types of greenhouses. In case of a closed greenhouse an air discharge duct 23 is included in the notch of the greenhouse, via which moist and/or warm air is discharged and can be reconditioned. In case of a known, open greenhouse type, and at absence of a such duct 23 for controlled discharge of air, for instance in an existing greenhouse without explicitly to the present invention directed adaptation, with the insight in accordance with the present invention, at a so-called temperature surplus in the greenhouse, the ventilation openings thereof are maintained closed as long as possible, such to the end of allowing the crop to arrive at optimal vaporisation and by that at adiabatic cooling in the greenhouse, to maintain $CO_2$-concentrations and to prevent loss of energy. Opening of windows 5 is in case of a temperature surplus in the greenhouse only performed if it is determined via temperatures sensors 2, that the crop itself no longer cooling. The disturbance in the growth process which occurs in reaction to a such action under such circumstances, is however, less extensive then the increase in yield that is realised with a such application of adiabatic cooling. It may in accordance with the invention be imagined however, that a known, open greenhouse is still provided with a system 23 for controlled discharge of air, or any system by which the boundary layer condition of the crop can be maintained in force.

Figure 4:
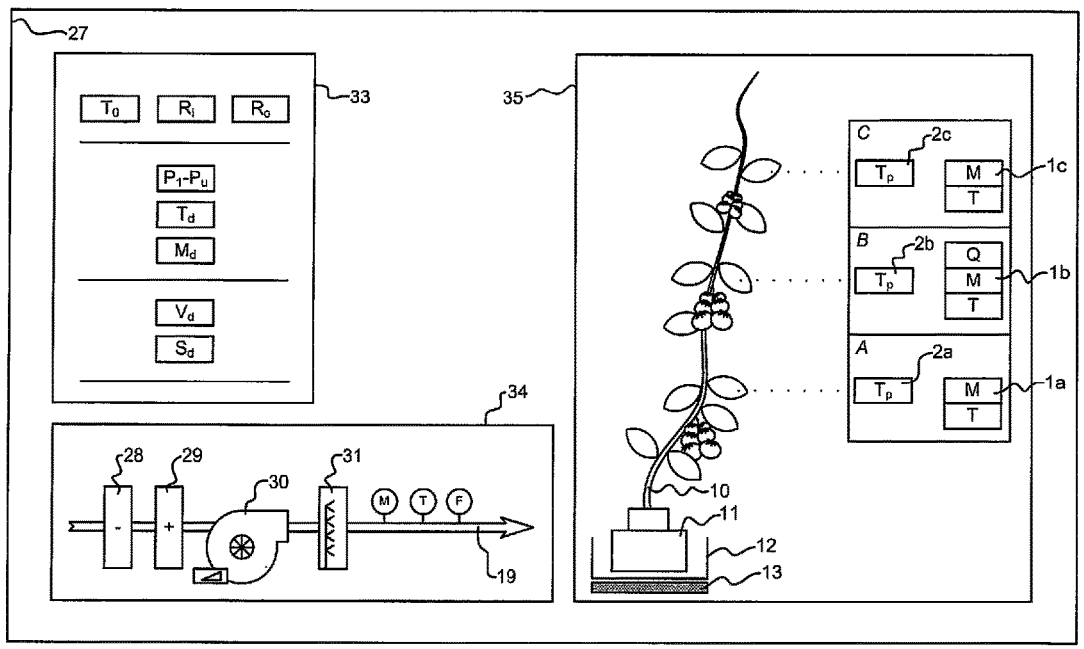

An optional optimisation of the above described new control system, consists in that a building, in casu the greenhouse is provided with a controlled air supply system via which fresh air can be supplied, i.e. administered at the crop. In particular this air is, with the aid of a thereto in the greenhouse included humidifying and dehumidifying installation, of a controlled degree of humidity. An installation for the realisation of fresh air conditioned in such a manner, with known per se conditioning elements and -configuration, is represented in FIG. 4. Conform preference and optimum as represented in FIG. 2, a supply tube 19 for supply of such conditioned air is included in the immediate vicinity of the crop, in particular with outlet openings 20 directly below the lateral side of the crop, as taken in a view of a cross section of a crop row. In accordance with preference, a tube of relatively large size, with a diameter at least corresponding to the with of a crop gutter 12, is included in the greenhouse. In principle, for instance such as would be possible at adaptation of an existing greenhouse, a such supply tube 19 may also be replaced by two of more smaller supply tubes. In all cases these debouche in an area that comprises the vertical projection of plant 10 but not that of the crop gutter 12. In all cases the supply according to the invention is arranged such, that the fresh air, while overcoming some exit resistance of the opening in the supply tube, is at least virtually free, that is to say is released unforced within the greenhouse space. A subsequent incorporation of this air in an intended flow of air 21, is under the aimed circumstances, that is to say a situation free of air streams of whirls, realised by pull, as a consequence of air elevating in the vicinity of the leaves, that is to say in the vicinity of a layer of leaves.

In conformity with preferred embodiment per substrate gutter 12 only a single supply channel 19 for air conditioned according to the invention is included, in particular right underneath thereof. In a such preference embodiment the supply tube for air according to the invention is of such dimensioning that the diameter thereof is larger then the width of the substrate gutter 12, c.q. the crop 10, and are the exit openings of the channel or tube formed by openings therein. In particular it is a preference to have an exit opening debouching at, at least 15 cm from the side of the substrate gutter. In this manner the contact of supplied air, at least the heat exchange thereof with the substrate gutter 12 is minimal, if not absent, and can the air be supplied to the crop at an intended initial temperature.

With the administering of conditioned air, that is to say air of an controlled temperature, an influencing instrument is intended in accordance with the invention, for the intended column of air 21, in the sense that for instance relatively warm air can pick up more moisture and can lead to an increased speed of ascending in the column 21. Conform a further elaboration of the invention also the humidity of the supplied air is conditioned, which provides a larger degree of freedom in the control or influencing of the air column 21, and with that of the vaporisation process of the crop 10. Finally according to the invention, in particular at a closed type greenhouse, the supply tube 19 for the supply of conditioned air is utilised for the supply of $CO_2$ or other gasses or vapours. It is recognised, that with the not or to a lesser extend opening of the windows 5, the $CO_2$-content of the greenhouse varies less strongly and that the required capacity for supply of $CO_2$ may be installed with relatively modest or lower capacity. This effect is re-enforced by the fact that the $CO_2$, at administering via an air duct 19 for directed but unforced supplied air, is via the air column 21 supplied directly in the vicinity of a leave deck, and is therein moreover, as a consequence of exchange via an undisturbed boundary layer, effectively and directly made available to the plant.

It is remarked, with further research underlying the invention, that with the presently developed method for influencing of the glasshouse climate, the crop reacts within a timeframe of several minutes with a temperature change upon a changed setting for temperature and/or for relative air humidity of the supplied, conditioned air. It is hence recognised that, apart from the thus adiabatic cooling of the greenhouse, or the utilisation of the crop as an instrument therefore, via the measurement of a temperature reaction per leave deck in a crop, and the at control of vaporisation varying between relative air humidity and temperature as thrusting powers therefore, strategies can be developed for the control of the crop growth as well. In this respect for instance, at a right strategy, that is to say measuring of crop temperature at different levels and reaction thereupon by adaptation of the condition of the supplied air, it may be prevented are that the crop will show unequal development, for instance drying at the lower part or else in the middle- or upper section. In conformance with a particular embodiment the method according to the invention is hence primarily focussed to the development of the crop, and the climate in the greenhouse thereof forming a resulting factor. With this latter concept the until now utilised concept for crop growth, with a deemed ideal glasshouse climate, gas been abandoned. The aeration or ventilation windows 5 are in the new model only opened for as far as the adiabatic cooling process has reached its limit, for instance as a consequence of extensive irradiation of light.

FIG. 4 illustrates in a schematic manner a control system 27 according to the invention, comprising a for the housing of an organism 10 intended building 35, an automatic control unit 33, and a conditioning arrangement 34 for the supply of fresh air to building 35, via supply element 19. This is in conformance with the invention included at least at the lower part of a space for an organism in building 35.

The conditioning arrangement comprises a by the control unit controllable ventilator 30, for the by air supply tubes 19 thrusting of fresh and conditioned air. Preceding the ventilator 30 is included in the air supply system of the building a heat conditioning arrangement, in particular with a heating element 29 and a cooling element 28 for cooling the supply air. In addition to the temperature treatment 28, 29 an air humidity conditioning element is included, with air humidifier 31 and an in the figure not represented air dehumidifier 32. In the model according to the present invention the ventilator controlled such, that is to say the air in a supply channel is put under such pressure that it exits the channel, while overcoming some exit resistance, at least virtually unforced, at least is virtually supplied as such to the crop.

The automatic control unit 33 in this example takes account of an outside temperature To, the irradiation in the building Ri, and an out radiation from the building Ro. For the purpose of crop control period or stage determination or establishments, such as elucidated in the following, can be entered as periods P1 to Pu, a desired crop- or organism temperature Td, and a desired humidity Md. In this example, in the control unit, for the prevention of turbulent air entry in a space to be controlled, a desired air flow Vd, as well as a desired rotations controls Sd can be entered.

In this example, for three levels A-C of the space 35 with a climate to be controlled to the well feeling of a therein present organism 10, detection of condition-parameters of organism 10 and of the inner climate are represented in the control system, at least are applied in the controls. These are at each level the temperature of the organism Tp, measured by a detections instrument 2a, 2b respectively 2c, and the air humidity M and temperature T of the inner climate, measured by respective detection instruments 1a-1c. In case that the organism is formed by a plant also a registration of the $CO_2$-content Q in the space is represented, preferably related to the level of the middle section of the plant. For almost superfluous checking of the climate controls weight measurers 13 for the crop may be present. Amongst others with help of the measured amount irradiation of solar light and the amount of supplied liquid over a determined amount of time, according to the invention an expected development of the crop is calculated and checked by means of actually measured values.

Furthermore the climate control system 27 comprises, at least preferably comprises, a conditioning arrangement 34 so as to supply conditioned, unsaturated air of a controlled gas composition and of a controllable temperature and degree of humidity at the space for the organism. It thereto comprises a cooling unit 28 for the cooling of air to be supplied, such that this becomes saturated and by condensation looses moisture. Thus 'dried' air is via a thereto present air heating unit 29 brought at a temperature T indicated by the controls, taking account of cooling which occurs at the subsequent humidification by humidifying unit 31 of the 'dried' and heated air to a desired, and thus controlled air humidity level M. The thus conditioned air is supplied to the building by a ventilator 30 with a determined flow F via air supply means 19, at least to the space with a climate to be controlled. Preferably the humidifier 31 is included after the ventilator 30 in the supply means 19 as taken in the direction of supply, while the de-humidification units 28, 29 are included before that. Finally the conditioning arrangement comprises registration means in the supply means for the registration of values for humidity M, temperature T and flow F of the conditioned air.

In the present example by way of a greenhouse, it can be postulated that where the known systems for climate control, direct or control temperature, the new model primarily controls factors of air flow in the form of circulation along the plant, ventilation of the greenhouse space and composition of air administered at the plant. The factors greenhouse temperature, greenhouse air humidity, $CO_2$-content and the gas composition in the greenhouse are in the new model regarded as derivatives of crop behaviour. In conformance with the invention these are factors by which the airflow can be influenced. It is characterising for the model according to the invention that it is focussed to control, which in control technics means that, different from the common controls for glasshouse climate, a feedback system is present. A background for the invention is the experience that an organism, in particular a plant physiologically reacts very strongly to alongside flow of air. It appears that even the growth, the vaporisation, and the development amongst which the ripening of a plant can be directed by the control of the alongside flow of air.

Target of the controls according to the invention is the influencing of the vaporisation and the improvement of the intake of $CO_2$ by the realisation of controlled, vertical airflow alongside the plant. For a such, further going elaboration, a numeric's based example is provided in the following by way of a climate controls for a tomatoes crop.

A crop then evaporates according to a "natural" evaporation profile. This is a layering in vaporisation at which the crop towards its upper section, that is to say at its head side, evaporates more than at its lower part. By an according to the invention controlled flow of air moisture is equally discharged and $CO_2$ supplied, with as a result a significant increase in production of 10-25% relative to the traditional method of crop growth, at least, method of climate control.

By controlling in response to moisture- and temperature differences in the crop (in vertical direction) and by the supply of unsaturated air with an adaptable percentage of the saturated moisture content, a horticulturalist or farmer can, with the system according to the invention, and with the plant as feedback, direct the crop vegetatively and generatively. Depending on the growth target, an ideal glasshouse climate for crop growth and development is subsequently realised.

By way of an example for a tomato crop the following values are provided in the light of the model according to the invention, at which the plant condition at three more or less equally distributed places in height of the plant is measured:

Generatively: a moisture deficit (between plant and greenhouse) of more then 2.1 g per kg air in the lower segment; 2.5 to 2.7 g per kg air in the middle segment; and 3.0 to 5.0 g per kg air in the upper segment.

Vegetatively: a moisture deficit (between plant and greenhouse) smaller then 2.0 g per kg air in the lower segment; 2.0 to 2.3 g per kg air in the middle segment; 2.5 to 3.0 g per kg air in the upper segment.

Prevention of diseases: a moisture deficit (between plant and greenhouse) larger then 1.1 g per kg air in the lower segment; larger then 2.3 g per kg air in the middle segment; larger then 2.3 g per kg air in the upper segment.

In terms of installation technics, use can be made for instance of a P+PI-control or a double PID-control so as to allow the above described process to proceed as accurate as possible.

At the control of the quality of the air brought in, three climate factors play a role: air humidity, temperature and $CO_2$. With respect to the moisture controls it is a plant physiologic rule that the supplied air is to be unsaturated. The reason for this is that the along flowing, unsaturated air then collects evaporating water better. By the collecting of evaporation moisture, the steadily becomes lighter and ascends as a consequence of decrease in specific mass. A subtle flow of air is generated alongside the plant. From testing of the model according to the invention with saturated air it has proven that the vaporisation profile then works out negatively in the sense that the crop in the lower segment then does not evaporate. If the temperature of the air supplied is all the more also too low, a relative drying of the middle segment and the top segment occurs, by which the flowering increases too strongly and the outgrow of fruits is stagnated.

The invention hence proposes to bring in unsaturated air by departing from air supply with an adaptable percentage of the saturated moisture content, the content where condensation occurs. By the contact with unsaturated air the plant will increase evaporation. By the addition by the plant of moisture to the air, it becomes lighter, the specific mass decreases, and the humid air ascends. Hence, alongside the plant a column of ascending air is generated as it were. By this the plant can, apart from in the lower segment also in the middle segment and the top segment optimal, at least in sufficient and controllable amount evaporate and discharge moisture.

In the preceding set up according to the invention the eventual result will be that the moisture gradient along the plant shows a constant course. With the new controls in fact there is realised an ideal pattern. In conformance with the earlier example: a moisture deficit (between plant and greenhouse) of 2.3 g per kg air in the lower segment; 2.5-2.7 g per kg air in the middle segment; and 3.0-5.0 g per kg air in the upper segment. In the new model this happens with brought in air which is related to the greenhouse air temperature and the relative air humidity. In a numeric example this may largely look like what follows from Entered greenhouse temperature 20° C. (to be set)
Saturated humidity 15 g/kg (A given from the Mollier diagram)
Desired Rh (Relative humidity) 80% (model, new entrance)
Calculated air humidity 12 g/kg (value before air conditioning)

At the control of the temperature of the conditioned air brought in, a fixed value is utilised, related to the plant temperature. Adaptable in the model according to the invention are temperature for greenhouse air for the dawn, morning, midday, aftermidday, evening and night. In conformance with a particular elaboration of the present invention the temperature controls are fitted with an irradiation dependent controls. At such, favourably the temperature may be raised in dependence of irradiation. By way of example the following is presented:

Temperature setting day 21° C.
Start irradiation trajectory 200 W/m2
End irradiation trajectory 500 W/m2
Light correction 2° C.

As an elucidation of this example it is to be known that at a irradiation in the greenhouse of 200 W/m2 the temperature is raised with 0° C. and remains 21° C. At increasing radiation the temperature is proportionally raised to for instance a maximum of 23° C. The irradiation increase is in the model according to the invention applied dampened, with a proceeding average over a predetermined time span, for instance 10 minutes.

With respect to the $CO_2$-controls the plant at daytime consumes $CO_2$ for the photosynthesis, and during night releases $CO_2$ by dissimilation and from plant remains. $CO_2$-dosing is only desired during daytime, during nighttime the $CO_2$-content raises with dissimilation and with reduction processes in plant remains. The production of the crop is directly coupled to the $CO_2$-concentration in a for the crop applicable climate. Optimum would be a content between 700 and 1100 ppm, proportionally dependent from the amount of irradiated light. The $CO_2$-controls is in the model according to the invention are preferably coupled irradiation dependent to the temperature- and moisture controls, wherein only at daytime, or from sunrise to sun set, dosage takes place. By way of numerical example in this respect the following holds for $CO_2$ dosage during the day:

Base level 500 ppm at 200 W/m2
End level 1200 ppm at 500 W/m2

Relative to the temperature controls, in conformance with insight of the invention, the irradiation dependent controls for $CO_2$ are to be applied dampened, for example with a proceeding average irradiation over 20 minutes.

In conformance with again further elaboration of the controls, at least a control system in accordance with the invention, such is equipped with a warning signal on the monitor, which is coupled to an operating time measuring. The farmer in the glimpse of an eye may see the quality of the controls. In this context holds as an example:

Green light=OK (satisfies a pre-determinable criterion)
Red light=Not OK (does not satisfy a pre-determinable criterion)

As a criterion for the temperature in this further elaboration for example is held that the measured plant temperature in the middle, minus the measured greenhouse temperature in the middle is to be smaller than then about 0.3° C. As a criterion for the air humidity is held that the measured moisture deficit between plant and greenhouse air should be between 2.5 g/kg and 3.5 g/kg.

The invention apart from that indicated in the preceding relates as well to all details in the figures, at least for as far as these may be deduced directly and unambiguously for a person skilled in the art, as to all indicated in the following set of claims.

The invention claimed is:

1. A method for controlling and directing climate in a space for housing or accommodation of a living organism, wherein a boundary layer of moist air is present around at least a part of the organism and the organism induces air to rise vertically along the organism due to natural discharge of moisture by the organism, the climate comprising at least a temperature factor, the method comprising:

providing a climate control installation comprising a first sensor set provided near the organism comprising temperature and humidity sensors directed at the organism at two different height levels for detecting temperature and humidity of the air surrounding the organism, a second sensor set for detecting a temperature of the organism at two height-levels within a height range of the organism, and air supplies and discharges respectively for the supply and discharge of air, wherein the air supplies comprise exit openings and are included in the space at a lower level than the discharges and below an upper part of the organism;

determining an amount of change in speed in a vertical direction of air surrounding the organism, by measuring at least temperature and humidity of the air surrounding the organism at the two different height levels at the organism with the first sensor set;

determining a temperature of the organism at the two height-levels by measuring the temperature of the organism at the two height-levels with the second sensor set;

calculating a temperature difference between an actual determined temperature of the organism at an upper height level of the two height levels and a desired temperature of the organism at said height level, wherein the desired temperature at the upper height level is based on the actual temperature of the organism measured at a lower of the two height levels and on the humidity and temperature of the air surrounding the organism measured by the lower of the temperature and humidity sensors of the first sensor set;

administering air conditioned under the influence of the climate control installation, wherein the conditioned air is unsaturated with respect to moisture content;

adjusting, based on the change in air speed and the temperature difference, the temperature and/or air humidity of the air supplied to the space through the air supplies to control the flow of conditioned air that is provided by the air supplies to the space at the exit openings, wherein, in said administering conditioned air, an amount of energy is added as required for leaving said exit opening of the air supplies while ensuring that the boundary layer remains present around at least the part of the organism, and wherein the temperature and humidity sensors of the first sensor set are located in the pathway of the vertically rising air that is induced by the organism.

2. The method according to claim 1, wherein detection of temperature at the organism and of temperature and humidity of the air takes place at corresponding height levels.

3. The method according to claim 1, wherein the climate control installation realizes a vertical air movement along the organism in the space.

4. The method according to claim 1, wherein the administering of conditioned air comprises inducing a vertical air movement along an organism, within a range in which exchange of moisture takes place, wherein the vertical stream of air is influenced by means of a control variation of at least one of air humidity, temperature and gas composition of air present in the space.

5. The method according to claim 1, wherein the climate control installation influences air flow along the organism by influencing heat content of the air in the space by providing, with the air supplies, air of a larger of smaller heat content than air at any height level in the space along the height range of the organism.

6. The method according to claim 5, wherein the air of larger heat content is offered in reaction to a difference between detected and desired heat content of the air, in relation to the organism.

7. The method according to claim 5, wherein the climate control installation produces a periodic variation of decelerating and accelerating vertical stream of air.

* * * * *